(12) United States Patent
Onoda et al.

(10) Patent No.: US 11,271,764 B2
(45) Date of Patent: Mar. 8, 2022

(54) CHAT TERMINAL DEVICE, CHAT SYSTEM, CHAT DISPLAY METHOD, AND CHAT DISPLAY PROGRAM

(71) Applicant: JVC KENWOOD Corporation, Yokohama (JP)

(72) Inventors: Hideaki Onoda, Yokohama (JP); Jiro Uzaki, Yokohama (JP); Masaki Mochizuki, Yokohama (JP)

(73) Assignee: JVC KENWOOD Corporation, Yokohama (JP)

( * ) Notice: Subject to any disclaimer, the term of this patent is extended or adjusted under 35 U.S.C. 154(b) by 108 days.

(21) Appl. No.: 15/942,718

(22) Filed: Apr. 2, 2018

(65) Prior Publication Data

US 2018/0343136 A1 Nov. 29, 2018

(30) Foreign Application Priority Data

May 23, 2017 (JP) .............................. JP2017-101731

(51) Int. Cl.
| | | |
|---|---|---|
| *H04L 12/18* | (2006.01) | |
| *H04L 12/58* | (2006.01) | |
| *H04L 51/04* | (2022.01) | |
| *H04L 51/046* | (2022.01) | |

(52) U.S. Cl.
CPC .......... *H04L 12/1827* (2013.01); *H04L 51/04* (2013.01); *H04L 51/046* (2013.01)

(58) Field of Classification Search
USPC .......................... 709/227–229, 242–244, 246
See application file for complete search history.

(56) References Cited

U.S. PATENT DOCUMENTS

| | | | | |
|---|---|---|---|---|
| 8,612,534 B1* | 12/2013 | Hossack | ............. | H04L 65/4015 709/206 |
| 2010/0190551 A1* | 7/2010 | Iwakiri | ................... | A63F 13/10 463/31 |
| 2010/0275224 A1* | 10/2010 | Sheng | .................. | H04N 21/472 725/14 |
| 2014/0129963 A1* | 5/2014 | Portale | ................ | H04L 12/1859 715/753 |
| 2015/0058730 A1* | 2/2015 | Dubin | ................... | A63F 13/327 715/719 |

(Continued)

FOREIGN PATENT DOCUMENTS

| | | |
|---|---|---|
| JP | 2002-222471 | 8/2002 |
| JP | 2011-215530 | 10/2011 |

(Continued)

*Primary Examiner* — Younes Naji
*Assistant Examiner* — Da T Ton
(74) *Attorney, Agent, or Firm* — Amin, Turocy & Watson, LLP

(57) ABSTRACT

A chat terminal device includes a communication unit, a storage unit, and a control unit. The communication unit acquires match situation data representing the situation of a match and chat data representing a chat content corresponding to the match from a server to which the match situation data and the chat data are uploaded, the storage unit stores the match situation data and the chat data which are acquired by the communication unit, in association with upload time at which the data are uploaded to the server, and the control unit causes different areas of a display unit to display the match situation data and the chat data which are stored in the storage unit.

7 Claims, 8 Drawing Sheets

(56) References Cited

U.S. PATENT DOCUMENTS

2015/0248919 A1\* 9/2015 Homma ............... G11B 27/327
386/243

FOREIGN PATENT DOCUMENTS

| JP | 2015-071076 | 4/2015 |
| JP | 2017-041286 | 2/2017 |
| WO | 2014/069114 | 5/2014 |

\* cited by examiner

FIG.3

| PITCHING ID | AT-BAT ID | INNING | TOP/BOT-TOM | BATTER SCORE INFORMATION ||| PITCHING RESULT INFOR-MATION | ON-BASE INFOR-MATION | RUNNER SCORE INFORMATION |||TAG INFOR-MATION |
|---|---|---|---|---|---|---|---|---|---|---|---|---|
| | | | | BAT-TING OR-DER | INDI-VIDUAL ID | | | | FIRST-BASE RUNNER (INDIVIDUAL ID) | SECOND-BASE RUNNER (INDIVIDUAL ID) | THIRD-BASE RUNNER (INDIVIDUAL ID) | |
| A085 | D005 | 8 | BOT-TOM | 5 | 005 | BALL | | -- () | -- () | -- () | TA0085 |
| A086 | D005 | 8 | BOT-TOM | 5 | 005 | SWING AND MISS | | -- () | -- () | -- () | TA0086 |
| A087 | D005 | 8 | BOT-TOM | 5 | 005 | STRIKE | | -- () | -- () | -- () | TA0087 |
| A088 | D005 | 8 | BOT-TOM | 5 | 005 | SINGLE | 1 | -- () | -- () | -- () | TA0088 |
| A089 | D006 | 8 | BOT-TOM | 6 | 006 | BALL | | -- (005) | -- () | -- () | TA0089 |
| A090 | D006 | 8 | BOT-TOM | 6 | 006 | FOUL | | -- (005) | -- () | -- () | TA0090 |
| A091 | D006 | 8 | BOT-TOM | 6 | 006 | SINGLE | 1 | SECOND (005) | -- () | -- () | TA0091 |
| A092 | D007 | 8 | BOT-TOM | 7 | 007 | SINGLE | 1 | SECOND (006) | THIRD (005) | -- () | TA0092 |
| A093 | D008 | 8 | BOT-TOM | 8 | 008 | FOUL | | -- (007) | -- (006) | -- (005) | TA0093 |
| A094 | D008 | 8 | BOT-TOM | 8 | 008 | STRIKE | | -- (007) | -- (006) | -- (005) | TA0094 |
| A095 | D008 | 8 | BOT-TOM | 8 | 008 | STRIKEOUT | 0 | -- (007) | -- (006) | -- (005) | TA0095 |
| A096 | D009 | 8 | BOT-TOM | 9 | 009 | SWING AND MISS | | -- (007) | -- (006) | -- (005) | TA0096 |
| A097 | D009 | 8 | BOT-TOM | 9 | 009 | STRIKE | | -- (007) | -- (006) | -- (005) | TA0097 |
| A098 | D009 | 8 | BOT-TOM | 9 | 009 | SINGLE | 1 | SECOND (007) | THIRD (006) | HOME (005) | TA0098 |
| A099 | D010 | 8 | BOT-TOM | 1 | 001 | GROUNDER TO SECOND | 0 | -- (009) | -- (007) | -- (006) | TA0099 |
| A100 | D011 | 8 | BOT-TOM | 2 | 002 | FLY TO RIGHT | 0 | ׀ (009) | ׀ (007) | ׀ (006) | TA0100 |

FIG.4

| ENTRY ID | DATA ENTRY PERSON'S ID | ENTRY DATA | TAG INFORMATION |
|---|---|---|---|
| C054 | 999 | BOTTOM OF 8, BATTER 007, SINGLE TO CENTER | TC0054 |
| C055 | 052 | ○○○ | TC0055 |
| C056 | 017 | △△△ | TC0056 |
| C057 | 038 | ××× | TC0057 |
| C058 | 999 | BOTTOM OF 8, BATTER 008, STRIKEOUT | TC0058 |
| C059 | 052 | □□□ | TC0059 |
| C060 | 038 | ○△○ | TC0060 |
| C061 | 017 | △□× | TC0061 |
|  |  |  |  |

FIG.5

| TAG INFORMATION | UPLOAD TIME |
|---|---|
| TA0085 | 10:03:05 |
| TA0086 | 10:03:21 |
| TA0087 | 10:03:55 |
| ⋮ | ⋮ |
| TA0092 | 10:08:12 |
| TC0054 | 10:08:55 |
| TC0055 | 10:09:20 |
| TA0093 | 10:09:25 |
| ⋮ | ⋮ |

CHAT TERMINAL DEVICE, CHAT SYSTEM, CHAT DISPLAY METHOD, AND CHAT DISPLAY PROGRAM

CROSS-REFERENCE TO RELATED APPLICATION(S)

The present application claims priority to and incorporates by reference the entire contents of Japanese Patent Application No. 2017-101731 filed in Japan on May 23, 2017.

BACKGROUND

The present invention relates to a chat terminal device, a chat system, a chat display method, and a chat display program.

In sports matches or the like, for example, for understanding the situation of a match by people not participating in the match or not directly spectating the match, the situation of a match or the like is reported using chat messages. For example, in JP 2015-71076 A, a virtual online match sports bar is described which has a configuration causing the situation of a match and a chat content to be simultaneously displayed in real time.

In a technology described in JP 2015-71076 A, a scoreboard and chat messages can be checked in real time, but it is difficult to check the change of the situation of the match and the change of displayed chat messages in association with each other, for example, after the end of the match.

SUMMARY

A chat terminal device according to one embodiment includes a communication unit configured to acquire match situation data representing the situation of a match and chat data representing a chat content corresponding to the match from a server to which the match situation data and the chat data are uploaded, a storage unit configured to store the match situation data and the chat data which are acquired by the communication unit, in association with upload time at which the data are uploaded to the server, and a control unit configured to cause different areas of a display unit to display the match situation data and the chat data which are stored in the storage unit.

A chat system according to one embodiment includes a server to which match situation data representing the situation of a match and chat data representing a chat content corresponding to the match are uploaded, and a chat display terminal including a communication unit configured to acquire the match situation data and the chat data from the server, a storage unit configured to store the match situation data and the chat data which are acquired by the communication unit, in association with upload time at which the data are uploaded to the server, and a control unit configured to cause different areas of a display unit to display the match situation data and the chat data which are stored in the storage unit.

A chat display method according to one embodiment includes acquiring match situation data representing the situation of a match and chat data representing a chat content corresponding to the match from a server to which the match situation data and the chat data are uploaded, causing a storage unit to store the acquired match situation data and chat data in association with upload time at which the data are uploaded to the server, and causing different areas of a display unit to display the match situation data and the chat data which are stored in the storage unit.

A non-transitory computer readable recording medium storing therein a chat display program according to one embodiment causes a computer to execute a process, including acquiring match situation data representing the situation of a match and chat data representing a chat content corresponding to the match from a server to which the match situation data and the chat data are uploaded, causing a storage unit to store the acquired match situation data and chat data in association with upload time at which the data are uploaded to the server, and causing different areas of a display unit to display the match situation data and the chat data which are stored in the storage unit.

BRIEF DESCRIPTION OF THE DRAWINGS

FIG. 3 is an exemplary diagram illustrating score data stored in a score data storage unit;

FIG. 4 is an exemplary diagram illustrating chat data stored in a chat data storage unit;

FIG. 5 is an exemplary diagram illustrating synchronous data stored in a synchronous data storage unit;

DETAILED DESCRIPTION

Hereinafter, embodiments of a chat terminal device, a chat system, a chat display method, and a chat display program according to the present invention will be described with reference to the drawings. Note that the present invention is not limited to these embodiments. Furthermore, the component elements in the following embodiments include component elements readily substituted by those skilled in the art or substantially the same component elements.

Figure 1:
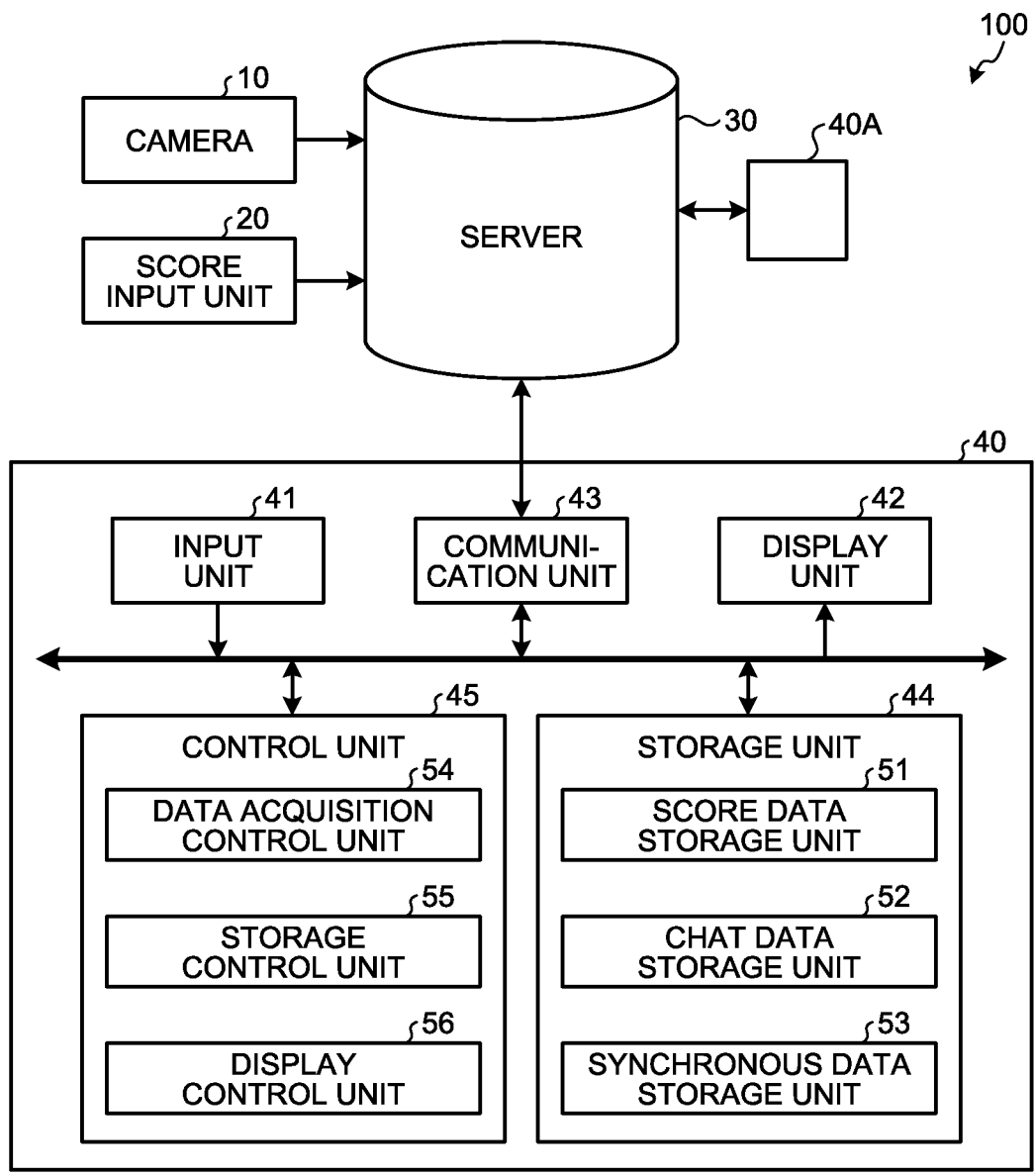
FIG. 1 is an exemplary block diagram illustrating a chat system according to the present embodiment.

FIG. 1 is an exemplary block diagram illustrating a chat system 100 according to the present embodiment. The chat system 100 illustrated in FIG. 1 is used to chat about a match of sports such as baseball. Use of the chat system 100 enables reporting the situation of a match or the like using chat messages, for example, to enable a person not participating in the match or a person not directly spectating the match to understand the situation of the match. Hereinafter, an example of a baseball match will be described as a sports match, but the sports match is not limited to the baseball match, and description can be made of other sports matches, such as soccer, volleyball, tennis, and badminton. Furthermore, the chat system 100 can be applied to a competition other than sports such as a dance contest (dance competition), a piano contest (musical performance competition), a card game contest (card game competition or table game competition), or a Karaoke singing competition (singing competition).

As illustrated in FIG. 1, the chat system 100 includes a camera 10, a score input unit 20, a server 30, and chat terminal devices 40 and 40A. For example, the camera 10 captures an image of a match at a match site. Captured image data captured by the camera 10 is transmitted to, for example, the server 30 and managed by the server 30. The camera 10 may include one camera 10 or a plurality of cameras 10. Note that, in the present embodiment, the camera 10 may be eliminated.

The score input unit 20 inputs match situation data representing the situation of a match to the server 30. In the present embodiment, match situation data representing a baseball match situation includes, for example, score data. The score data represents data constituting a score described in a baseball scorebook and represents an individual event of a series of events starting from a pitcher's pitching. The score represents a set of score data. Accordingly, a plurality of sets of score data are created per every pitcher's pitching, thereby creating a single score. For example, when batting results in flying out to right field and a first-base runner is tagged out while a runner is on first base, score data representing that the batter is put out, score data representing flying to right field, and score data representing that the first-base runner is out are created, and these sets of score data constitute a single score.

In addition to the score data exemplified above, the score may include score data such as a batter's action, a fielder's action, a fixed count, an advancement situation of a runner on base, or another action of the batter or the fielder. Specifically, the score may include score data such as strike, ball, foul, a batting result, the kind of batted ball, a fielder catching a ball, or a runner's advancement result. The batting result represents information such as out, single, double, triple, and homer. The kind of batted ball represents information such as ground ball, line drive, fly ball, or bunt and may be further categorized. The fielder catching a ball represents information for identifying a fielder actually catching a ball or the position of the fielder. The runner's advancement result represents information about the advancement of a runner on base, such as "first base to second base", and may further include another action of a batter or a fielder.

The score input unit 20 includes, for example, an application for inputting the score data as electronic data to the server 30. In this configuration, the score input unit 20 may be provided at a processor such as a personal computer installed outside the server 30. Alternately, the score input unit 20 may be provided at the server 30.

The server 30 integrally manages the chat system 100. The server 30 includes various applications, data, programs, and the like to manage the chat system 100. The server 30 employs, for example, a personal computer or a workstation but the server 30 is not limited to this.

In the server 30, a plurality of chat groups are set. The chat groups are individually set, for example, for each sport, match, or team. For each chat group, the server 30 performs various processes, which are described below.

To the server 30, score data input from the score input unit 20 and chat data representing a chat content corresponding to a match are input. The server 30 uploads the input score data and the chat data. Furthermore, the server 30 generates chat data on the basis of the input score data and uploads the chat data. For example, whenever new score data is input, the server 30 can generate chat data representing the content of the score data in characters or the like. Thus, when score data is updated, the updated score data can be confirmed as chat information.

When uploading score data and chat data, the server 30 causes upload time data to be added to the score data and the chat data. That is, the score data and the chat data which are uploaded by the server 30 include the upload time data. The server 30 includes a management application for managing score data and chat data. Furthermore, the server 30 includes a chat generation application for generating chat data on the basis of input score data. Furthermore, to the server 30, captured image data captured by the camera 10 may be input.

The chat terminal devices 40 and 40A each include an input unit 41, a display unit 42, a communication unit 43, a storage unit 44, and a control unit 45. The input unit 41, the display unit 42, the communication unit 43, the storage unit 44, and the control unit 45 are connected, for example, via a bus line or the like. The chat terminal device 40 includes a portable information terminal such as a mobile phone, a smartphone, a tablet PC, or a laptop personal computer.

The input unit 41 can perform predetermined input operation for inputting information. The input unit 41 outputs an instruction signal to the control unit 45 in accordance with input operation. The input unit 41 employs an input device such as a touch panel. Note that the input unit 41 may employ a button, a lever, a dial, a switch, or another input device, in addition to or instead of the touch panel. The input unit 41 outputs an instruction signal corresponding to predetermined input operation. The display unit 42 displays various information including characters and images. The display unit 42 includes a display panel such as a liquid crystal panel. The display unit 42 can display information including video.

Figure 2:
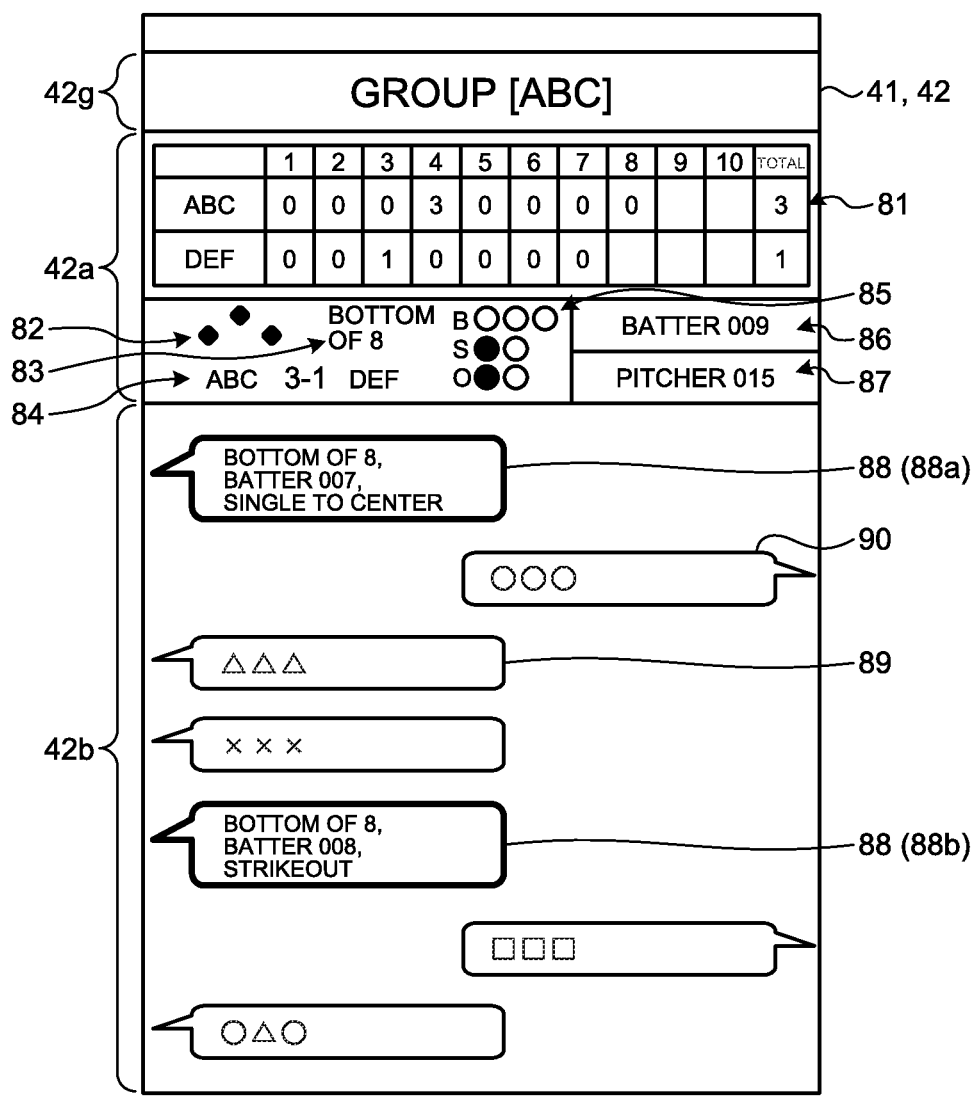
FIG. 2 is an exemplary diagram illustrating an input unit and a display unit of a chat terminal device according to the present embodiment.

FIG. 2 is an exemplary diagram illustrating the input unit 41 and the display unit 42 of the chat terminal device 40 according to the present embodiment. As illustrated in FIG. 2, the chat terminal device 40 includes the input unit 41 including for example a touch panel, and the display unit 42. That is, the touch panel as the input unit 41 is overlaid on the display panel as the display unit 42.

On the display unit 42, for example, a score display area 42a, a chat display area 42b, and a group display area 42g are displayed. The score display area 42a displays score data thereon. For example, in the score display area 42a, a scoreboard 81 for displaying a score for each inning, an advancement display 82 for displaying an advancement situation of a runner, an inning display 83 for displaying an inning, a score display 84 for displaying a total score of each team, a count display 85 for displaying the count of balls and strikes and the count of outs, a batter display 86 for displaying a batter, and a pitcher display 87 for displaying a pitcher are displayed. Note that display of the score display area 42a is not limited to this configuration, and, for example, part of the display may be omitted.

The chat display area 42b displays chat data thereon. For example, in the chat display area 42b, a server message 88 representing chat data generated by the server 30, other's message 89 representing chat data input from the other chat terminal device 40A different from the chat terminal device 40, and one's own message 90 representing chat data input from the chat terminal device 40, and the like are displayed. The server message 88 represents, for example, the content of score data input to the server 30 in characters. A server message 88a on the upper side of FIG. 2, for example, shows that a batter 007 single to center in the bottom of the eighth inning. Score data corresponding to this server message 88a shows, for example, the content indicated by a pitching ID A092 of FIG. 3, which is described later. Note that according to the content indicated by the pitching ID A092, pitching result information to the batter 007 is "single", but another content, such as a fielder's action, in the pitching ID A092 may be added by the server 30 to generate the chat data. Furthermore, a server message 88b on the lower side of FIG. 2 shows that a batter 008 is struck out in the bottom of the eighth inning. Score data corresponding to this server message 88b shows, for example, the content indicated by a pitching ID A095 of FIG. 3, which is described later.

Note that the server message 88 and the other's message 89 are displayed, for example, in a left side area of the chat display area 42b. Furthermore, the one's own message 90 is displayed, for example, in a right side area of the chat display area 42b. Furthermore, the server message 88 and the other's message 89 may be distinctively displayed, for example, in a manner that the messages are displayed in different frames. Thus, the server message 88 and the other's message 89 can be distinguished from each other. The group display area 42g displays information of a group to which an operator of the chat terminal device 40 belongs, therein.

When operation such as touch operation or scroll operation is performed with respect to a predetermined area of a surface of the touch panel, the input unit 41 outputs a predetermined instruction signal including positional information about the area in which the operation is performed and information of the operation. The positional information is set corresponding to, for example, a position of the display unit 42. Note that the configurations of the input unit 41 and the display unit 42 are not limited to the above configuration.

The communication unit 43 communicates information with an external device in a wired or wireless manner. The communication unit 43 transmits and receives chat data, score data, and the like with the server 30 on the outside.

The storage unit 44 includes a storage such as a hard disk drive or a solid-state drive. Note that the storage unit 44 may employ an external storage medium such as a removable disk. The storage unit 44 stores an operating system of the chat terminal device 40, various programs for controlling the operations of the input unit 41, the display unit 42, and the communication unit 43, a chat application for chatting, various programs, data, and the like. For example, the storage unit 44 may store frame data or the like of the score display area 42a, the chat display area 42b, the group display area 42g, and the like which are caused to be displayed on the display unit 42.

Furthermore, the storage unit 44 stores the chat display program including a process of acquiring match situation data representing the situation of a sports match and chat data representing a chat content corresponding to the match from the server 30 to which the match situation data and the chat data are uploaded, a process of causing the storage unit 44 to store the acquired match situation data and chat data in association with upload time at which each data is uploaded to the server 30, and a process of causing the match situation data and the chat data which are stored in the storage unit 44 to be displayed in a different area of the display unit 42.

The storage unit 44 includes a score data storage unit 51, a chat data storage unit 52, and a synchronous data storage unit 53.

The score data storage unit 51 stores score data received by the communication unit 43. FIG. 3 is an exemplary diagram illustrating score data stored in the score data storage unit 51. The example of FIG. 3 shows the score data in the bottom of the eighth inning. The score data illustrated in FIG. 3 includes batter score information 61, runner score information 62, and tag information 63. The batter score information 61 includes a pitching ID 64, an at-bat ID 65, inning information 66, top/bottom information 67, batting order information 68, an individual ID 69, pitching result information 70, and on-base information 71. Note that, the score data may include other information such as fielders' actions.

One pitching ID 64 is created whenever a pitcher pitches a ball. The pitching ID 64 has ascending pitching ID numbers which are applied as indices in order of pitching. One at-bat ID 65 is created whenever an at-bat is completed, that is, whenever a score is determined. One or a plurality of pitches is included in the same at-bat. The at-bat ID 65 has ascending at-bat ID numbers each of which is applied as an index to a single at-bat.

The inning information 66 is information representing an inning in which the pitching ID 64 and the at-bat ID 65 are created. The top/bottom information 67 is information representing the top and the bottom of an inning. The batting order information 68 is information representing a batting order corresponding to one score, and is represented by an integer from 1 to 9. The individual ID 69 is information for identifying a batter in one score. The individual ID 69 is associated with information such as a corresponding batter's name by using a table, not illustrated, or the like.

The pitching result information 70 is information representing a result of one pitching ID. Pitching result information with respect to the last pitching in one at-bat corresponds to a batting result in the one at-bat. The on-base information 71 is information representing batters on-base situation in the at-bat ID 65. The on-base information 71 is represented by, for example, 0 or 1. When the on-base information 71 is 0, the on-base information 71 represents that a corresponding batter is put out before reaching base. When the on-base information 71 is 1, the on-base information 71 represents that a corresponding batter reaches base on a hit or on hit-by-pitch.

The tag information 63 is information for identifying score data created for each pitching ID 64. Tag information 63 is created whenever one pitching ID 64 is created. The tag information 63 has tag numbers (TA0085, TA0086, . . . ) which are applied as indices in ascending order. Note that the pitching ID numbers of the pitching ID 64 may be used for the tag information.

The chat data storage unit 52 stores chat data received by the communication unit 43. FIG. 4 is an exemplary diagram illustrating chat data stored in the chat data storage unit 52. As illustrated in FIG. 4, the chat data includes an entry ID 75, a data entry person's ID 76, entry data 77, and tag information 78.

One entry ID 75 is created whenever chat data is input to or generated in the server 30. The data entry person's ID 76 is information for identifying a data entry person for one set of chat data. For example, for chat data generated by the server 30, the data entry person's ID 76 may have a predetermined value (e.g., "999"). The entry data 77 is information representing the content of a message displayed in the chat display area 42b. The entry data 77 includes, for example, character data or predetermined illustration data. The tag information 78 is information for identifying chat data of each entry ID 75. Tag information 78 is created whenever one entry ID 75 is created. The tag information 78 has tag numbers (TC0054, TC0055, . . . ) which are applied as indices in ascending order. Note that ID numbers of the entry ID 75 may be used for the tag information.

The synchronous data storage unit 53 stores synchronous data associating the score data with the chat data. FIG. 5 is an exemplary diagram illustrating the synchronous data stored in the synchronous data storage unit 53. As illustrated in FIG. 5, the synchronous data includes tag information 79 and upload time information 80. The tag information 79 is information corresponding to the tag information 63 of the score data and the tag information 78 of the chat data. The tag information 79 is arranged in order of the upload time information 80. The tag information 79 has tag numbers (TA0085, TA0086, . . . , TA0092, TC0054, TC0055, TA0093, . . . ) the same as, for example, those of the corresponding tag information 63 and tag information 78, but the tag information 79 is not limited to this description. For example, the tag information 79 may have a series of tag numbers independent of those of the tag information 63 and tag information 78. The upload time information 80 represents time at which the score data and chat data associated with the tag information 79 are uploaded to the server 30. Owing to the tag information 79 and the upload time information 80, the score data and the chat data are caused to be stored in association with the upload time.

The control unit 45 controls component units of the input unit 41, the display unit 42, and the communication unit 43. Furthermore, the control unit 45 performs calculation, processing, or the like in accordance with an instruction signal from the input unit 41. The control unit 45 includes a processor such as a central processing unit (CPU), and a storage device such as a random access memory (RAM) and a read only memory (ROM). The control unit 45 includes a data acquisition control unit 54, a storage control unit 55, and a display control unit 56.

The data acquisition control unit 54 accesses the server 30 via the communication unit 43 to acquire the score data and the chat data uploaded to the server 30.

The storage control unit 55 causes the storage unit 44 to store the acquired score data and chat data in association with the upload time. The storage control unit 55 arranges the tag information 63 of the score data and the tag information 78 of the chat data in chronological order on the basis of the upload time to generate the tag information 79. Owing to the tag information 79 and the upload time information 80, pieces of score data and pieces of chat data are stored to be arranged in chronological order on the basis of the upload time.

The display control unit 56 controls the content displayed on the display unit 42. The display control unit 56 controls the content displayed in the score display area 42a, on the basis of the score data stored in the storage unit 44. For example, when new score data is acquired from the server 30 and is stored in the storage unit 44, the content displayed in the score display area 42a are updated on the basis of the latest stored score data. Thus, the display control unit 56 can update the score data displayed in the score display area 42a, in real time.

Furthermore, the display control unit 56 can control the content displayed in the score display area 42a, on the basis of previous score data stored in the storage unit 44. For example, when the operator performs operation of inputting an inning or the like, which is desired to be displayed, from the input unit 41 or the like, the display control unit 56 displays score data according to a result of the input, in the score display area 42a. Accordingly, a match content can be reviewed, for example, during a match or after the end of the match.

Furthermore, the display control unit 56 controls the content displayed in the chat display area 42b, on the basis of the chat data stored in the storage unit 44. To display pieces of chat data in the chat display area 42b, the display control unit 56 displays as many pieces of chat data as can be displayed in the chat display area 42b, in one direction in chronological order, on the basis of the upload time. In the present embodiment, for example, as illustrated in FIG. 2, the pieces of chat data are displayed in chronological order from the upper side to the lower side of chat display area 42b in FIG. 2.

Furthermore, when new chat data acquired from the server 30 is stored in the storage unit 44, the display control unit 56 updates the content displayed in the chat display area 42b, on the basis of the latest chat data stored in the storage unit 44. In this configuration, the display control unit 56 determines whether the chat display area 42b has a space for displaying a new piece of chat data below the last piece of chat data in chronological order. When the chat display area 42b has a space for displaying the new piece of chat data, the display control unit 56 causes the space to display the new piece of chat data. Furthermore, when the chat display area 42b has no space for displaying the new piece of chat data, the display control unit 56 wholly scrolls the chat display area 42b in a direction in which the chronologically oldest piece of chat data of the pieces of chat data displayed in the chat display area 42b, that is, a piece of chat data displayed on the uppermost side of the chat display area 42b is pushed out upward from the chat display area 42b. Then, the display control unit 56 causes a lower space formed by scrolling to display the block of the new chat data. Thus, whenever new chat data is uploaded to the server 30 and stored in the storage unit 44, the display control unit 56 can update chat data displayed in the chat display area 42b, in real time.

Furthermore, the display control unit 56 can control the content displayed in the chat display area 42b, on the basis of previous chat data stored in the storage unit 44. For example, when the operator touches a position in the chat display area 42b of the input unit (touch panel) 41 and slides the touch position upward or downward, that is, when the chat display area 42b is manually scrolled, the display control unit 56 changes chat data displayed in the chat display area 42b, in accordance with the direction and amount of scroll. For example, when the operator slides the touch position upward, pieces of chat data uploaded later than pieces of chat data displayed until then are displayed in the chat display area 42b. Furthermore, when the operator slides the touch position downward, pieces of chat data uploaded earlier than the pieces of chat data displayed until then are displayed in the chat display area 42b. Note that a method of changing pieces of chat data displayed in the chat display area 42b is not limited to the above description, and another method, such as a button, a keyboard, or a mouse may be used.

Furthermore, in the present embodiment, the display control unit 56 can cause the score display area 42a and the chat display area 42b of the display unit 42 to synchronously display score data and chat data which correspond to each other in upload time. For example, as described above, when the display in the chat display area 42b is changed by the operator's operation, the display control unit 56 may change the display in the score display area 42a in accordance with the change of the display in the chat display area 42b. That is, after the change of the display, the display control unit 56 may cause the score display area 42a to display score data corresponding to the upload time of chat data displayed in the chat display area 42b.

In this configuration, the display control unit 56 detects the upload time of any one of the pieces of chat data displayed in the chat display area 42b after changing, for example, of the latest chat data, from the synchronous data storage unit 53. Next, the display control unit 56 detects tag information 79 of score data having the last upload time, from the detected upload time. Next, the display control unit 56 extracts a piece of score data corresponding to the detected tag information 79, from the score data storage unit 51. Then, the display control unit 56 causes the score display area 42*a* to display the extracted piece of score data.

Figure 6:
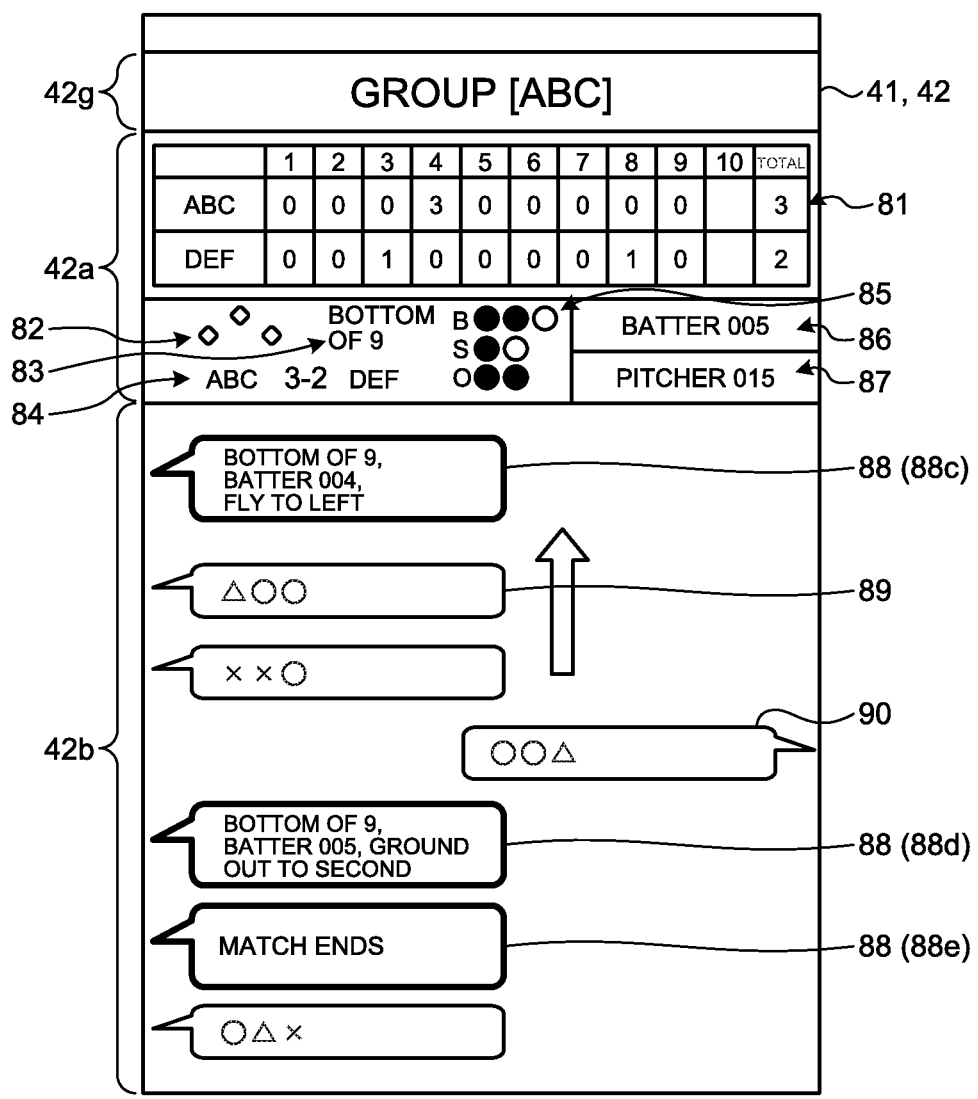
FIG. 6 is an exemplary diagram illustrating changed display in a chat display area.

FIG. 6 is an exemplary diagram illustrating changed display in the chat display area 42*b*. FIG. 6 illustrates a state of display in the chat display area 42*b* which is changed to a state representing the end of the match (in the bottom of the ninth inning) by scrolling the state of FIG. 2 (in the bottom of the eighth inning) upward. In this configuration, as illustrated in FIG. 6, the chat display area 42*b* displays server messages 88*c* to 88*e*. The server message 88*c* is chat data representing, for example, that a batter 004 flies out to left field in the bottom of the ninth inning. Furthermore, the server message 88*d* is chat data representing that a batter 005 grounds out to second in the bottom of the ninth inning. Furthermore, the server message 88*e* is chat data showing that the match ends.

Furthermore, the score display area 42*a* displays score data at upload time corresponding to the server messages 88*c* to 88*e* in the chat display area 42*b*. For example, the scoreboard 81 shows a state in which the match ends in 0 point in the bottom of the ninth inning. Furthermore, the advancement display 82, the inning display 83, the count display 85, the score display 84, the batter display 86, and the pitcher display 87 also similarly display that the match is over.

Note that the state of display in the chat display area 42*b* of FIG. 6 may be scrolled downward to be returned to the state of FIG. 2. As described above, display of the score data and the chat data in association with the upload time enables confirmation of the change in score data and the change in display of the chat data, which correspond to each other, for example, to review a match content after the end of the match.

In the display control unit 56 as well, for example, when the content displayed in the score display area 42*a* is changed by the operator's operation, the display in the chat display area 42*b* may be changed in accordance with the change of the display in the score display area 42*a*. In this configuration, chat data corresponding to the upload time of score data changed and displayed in the score display area 42*a* can be displayed in the chat display area 42*b*.

In this configuration, the display control unit 56 detects the upload time of the score data changed and displayed in the score display area 42*a*, from the synchronous data storage unit 53. Next, the display control unit 56 detects tag information 79 of chat data having the last upload time, from the detected upload time. Next, the display control unit 56 extracts a piece of chat data corresponding to the detected tag information 79, from the score data storage unit 51. Then, the display control unit 56 causes the chat display area 42*b* to display a plurality of pieces of chat data including the extracted piece of chat data. At this time, the extracted piece of chat data is caused to be displayed on the lowermost side so that, for example, the extracted piece of chat data is the latest chat data in the chat display area 42*b*. Furthermore, above this extracted piece of chat data, the chat display area 42*b* is caused to display pieces of chat data before this extracted piece of chat data one by one in chronological order, within a displayable range. Note that displaying the chat data is not limited to this description, and the chat data may be displayed in another manner.

Note that when causing the score display area 42*a* and the chat display area 42*b* of the display unit 42 to synchronously display the score data and the chat data which correspond to each other in upload time, the display control unit 56 detects the changes of the score display area 42*a* and the chat display area 42*b* at predetermined intervals. Thus, the changes of the score display area 42*a* and the chat display area 42*b* can be accurately detected. Note that the display control unit 56 may detect the changes of the score display area 42*a* and the chat display area 42*b* on the basis of a screen operation event.

Figure 7:
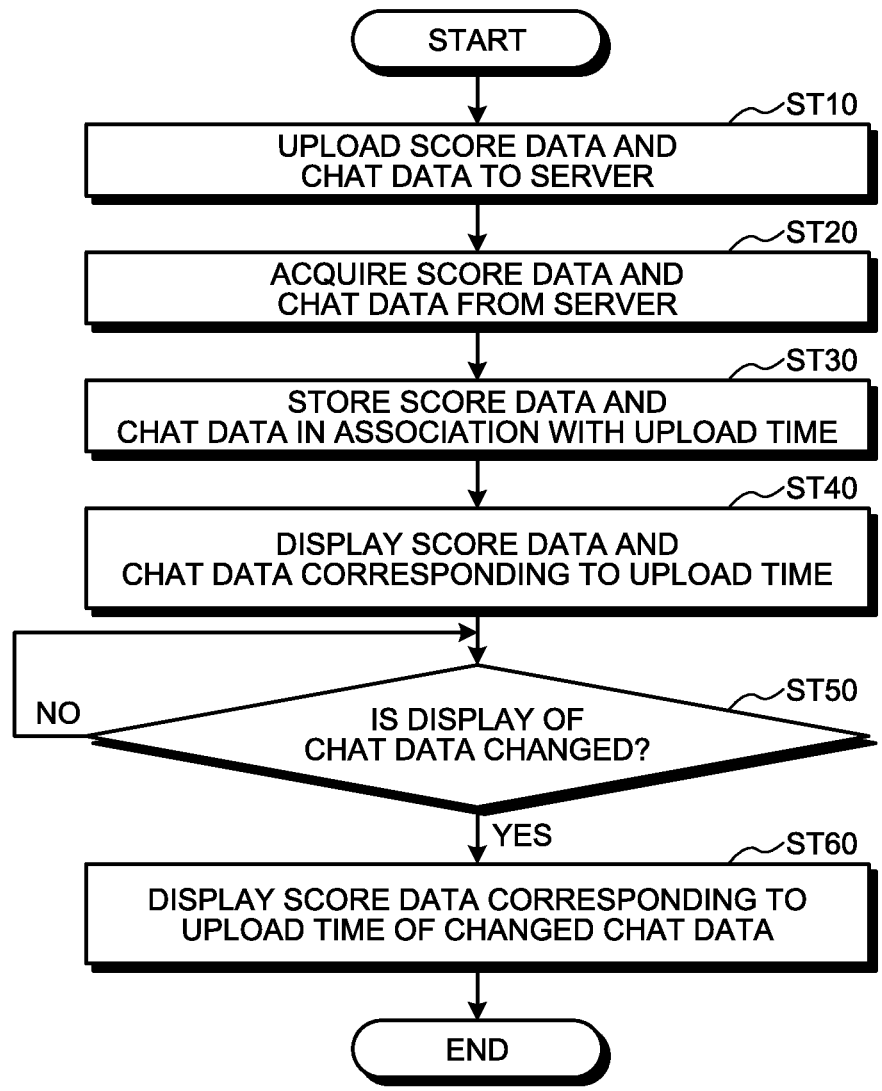
FIG. 7 is an exemplary flowchart illustrating the operation of the chat system according to the present embodiment.

Next, the operation of the chat system 100 configured as described above will be described. FIG. 7 is an exemplary flowchart illustrating the operation of the chat system 100 according to the present embodiment. FIG. 7 illustrates an example of the chat display method according to the present embodiment. As illustrated in FIG. 7, in the server 30, score data is input from the score input unit 20, and chat data is input by the chat terminal devices 40 and 40A or the like. Furthermore, the server 30 generates chat data on the basis of the score data. The server 30 uploads these score data and chat data and brought into a state enabling reception from the chat terminal devices 40 and 40A or the like (step ST10).

When the score data and the chat data are uploaded to the server 30, the data acquisition control unit 54 causes the chat terminal device 40 to acquire the score data and the chat data from the server 30 (step ST20). In step ST20, the data acquisition control unit 54 transmits, for example, a signal for obtaining permission of downloading the score data and the chat data, to the server 30 via the communication unit 43. When receiving the signal, the server 30 transmits the score data and the chat data to the chat terminal device 40, after predetermined authentication and the like.

When the score data and the chat data are acquired from the server 30, the storage control unit 55 causes the storage unit 44 to store the acquired score data and chat data in association with the upload time (step ST30). In step ST30, the tag information 79 and the upload time information 80 are stored in the synchronous data storage unit 53.

Then, the display control unit 56 controls the content displayed in the display unit 42, on the basis of the score data and the chat data stored in the storage unit 44. At this time, the display control unit 56 can cause the score display area 42*a* and the chat display area 42*b* of the display unit 42 to synchronously display score data and chat data which correspond to each other in upload time (step ST40).

Then, the display control unit 56 detects whether display in the chat display area 42*b* is changed, at predetermined intervals (step ST50). When the display in the chat display area 42*b* is not changed (No in step ST50), the operation of step ST50 is caused to be repeated. Furthermore, when the display in the chat display area 42*b* is changed (Yes in step ST50), the display control unit 56 changes the display in the score display area 42*a*, in accordance with the change of the display in the chat display area 42*b* (step ST60). The display control unit 56 detects whether the display in the score display area 42*a* is changed, at predetermined intervals, as described in the above example. When the display in the score display area 42*a* is changed, the display in the chat display area 42*b* is changed in accordance with the change of the display in the score display area 42*a*. Note that, in step ST50, the display control unit 56 may perform detection of for example the changes of the score display area 42*a* and the chat display area 42*b* on the basis of a screen operation event, instead of detecting whether the display in the chat display area 42*b* is changed, at predetermined intervals.

As described above, the chat terminal device 40 according to the present embodiment includes the communication unit 43, the storage unit 44, and the control unit 45. The communication unit 43 acquires score data representing the situation of a sports match and chat data representing a chat content corresponding to the match, from the server 30 to which the score data and the chat data are uploaded, the storage unit 44 stores the score data and the chat data acquired by the communication unit 43, in association with upload time at which the data are uploaded to the server 30, and the control unit 45 causes different areas of the display unit 42 to display the score data and the chat data which are stored in the storage unit 44.

Thus, the score data and the chat data can be handled to be associated with each other on the basis of the upload time stored in the storage unit 44. Thus, for example, the score data and the chat data corresponding to each other in upload time can be displayed in the score display area 42*a* and the chat display area 42*b* of the display unit 42. Accordingly, a previous match content can be reviewed, for example, during a match or after the end of the match.

Furthermore, in the chat terminal device 40 according to the present embodiment, the control unit 45 causes the score display area 42*a* and the chat display area 42*b* of the display unit 42 to synchronously display score data and chat data which are stored in the storage unit 44 and correspond to each other in upload time. Thus, the score data and the chat data corresponding to each other in upload time can be readily confirmed.

Furthermore, in the chat terminal device 40 according to the present embodiment, when one of score data or chat data displayed in the display unit 42 is changed, the control unit 45 changes the other data so that the other data is displayed corresponding to the upload time of the one data changed and displayed. Thus, when the display of the score data and the display of the chat data are changed, the score data and the chat data are also synchronously displayed corresponding to the upload time.

The technical scope of the present invention is not limited to the embodiments described above, and changes and alterations may be made appropriately within the scope and spirit of the invention. For example, in the embodiments described above, when display in the chat display area 42*b* is changed from a state representing the end of a match of FIG. 6 to a state representing the bottom of the eighth inning, display in the score display area 42*a* is changed to a state of the bottom of the eighth inning, in synchronization with the display in the chat display area 42*b*. In this configuration, the display in the score display area 42*a* is not the latest the situation of the match.

Figure 8:
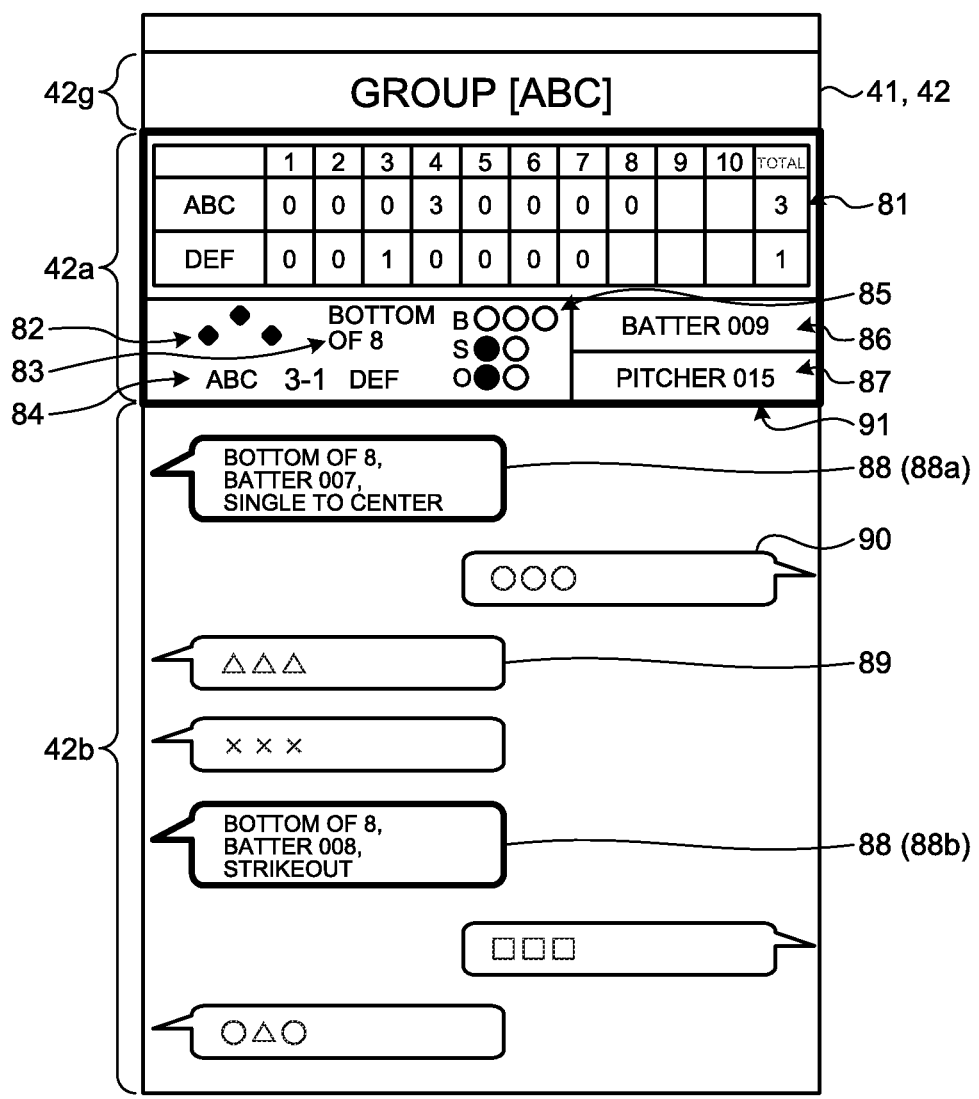
FIG. 8 is a diagram illustrating a display state of a display unit according to a modification.

FIG. 8 is a diagram illustrating a display state of a display unit 42 according to a modification. As illustrated in FIG. 8, when the score display area 42*a* is changed, the display control unit 56 may apply highlight such as an outer edge portion 91 to represent that the display in the score display area 42*a* is not the latest display. Thus, the operator can readily understand that the score display area 42*a* is not in the latest state.

Figure 9:
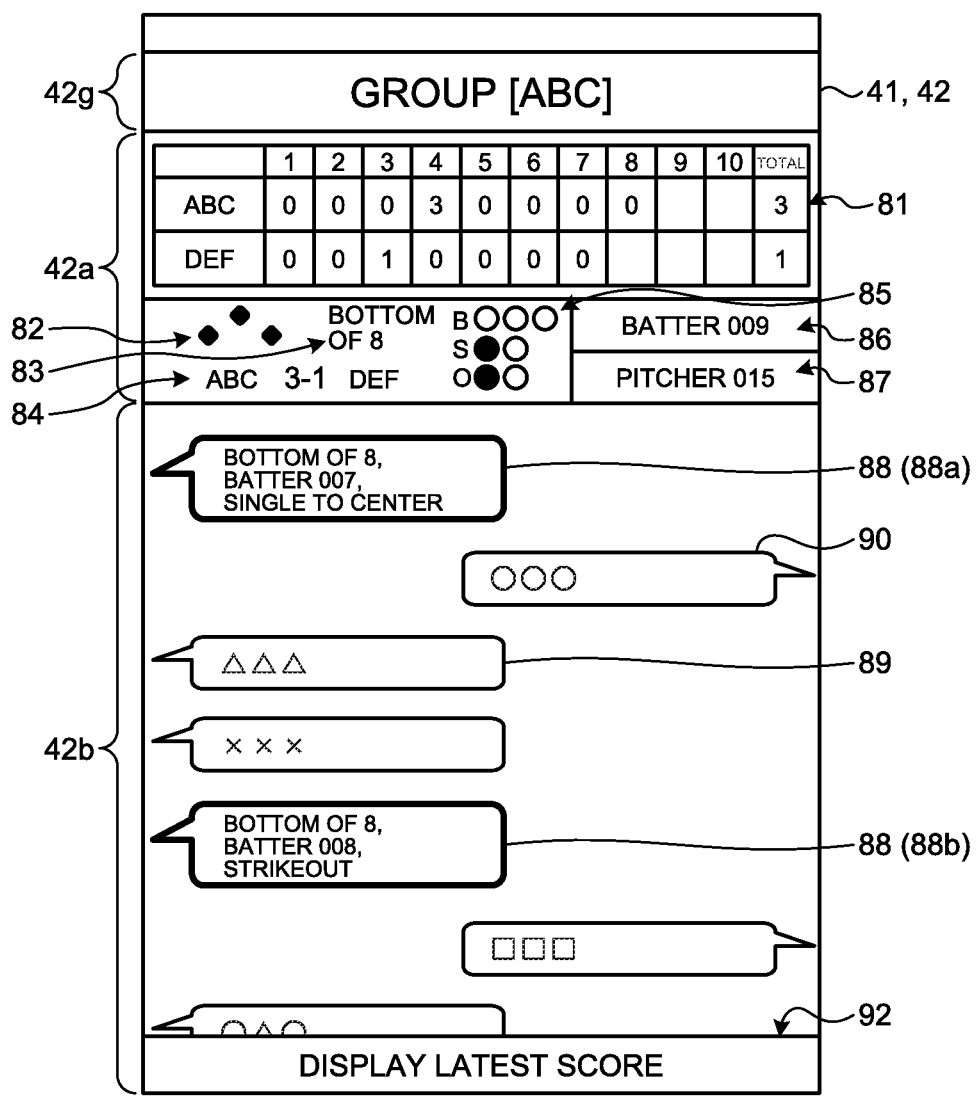
FIG. 9 is a diagram illustrating a display state of a display unit according to a modification.

FIG. 9 is a diagram illustrating a display state of a display unit 42 according to a modification. As illustrated in FIG. 9, the display control unit 56 may cause a button 92 to be displayed to return display in the score display area 42*a* to the latest display. Thus, the display in the score display area 42*a* can be quickly returned to the latest display without performing scroll operation or the like. Furthermore, in a state of FIG. 9, when the latest the situation of the match is updated, the button 92 may be blinked or the highlight may be applied to enable the operator to readily understand the change of the situation of the match.

Furthermore, in the embodiments described above, an area for displaying the score data is limited to the score display area 42*a*, but the area is not limited to the score display area 42*a*. For example, the score data may be displayed in the chat display area 42*b*.

What is claimed is:

1. A chat terminal device comprising:
a communication circuitry configured to acquire match situation data, server chat data, and user chat data from a server to which the match situation data, the server chat data, and the user chat data are uploaded, the match situation data representing a situation of a match, the server chat data corresponding to the match and being generated by the server, and the user chat data representing chat content corresponding to the match and input by a user;
a storage configured to store the match situation data, the server chat data, and the user chat data acquired by the communication circuitry in association with respective upload times at which the match situation data, the server chat data, and the user data are uploaded to the server; and
a hardware controller configured to cause a first area of a display unit to display the match situation data stored in the storage and to cause a second area of the display unit to display, at a same time, the server chat data and the user chat data stored in the storage and corresponding to each other in the upload times,
wherein
the hardware controller further includes a hardware storage controller,
the hardware storage controller is configured to:
create tag information identifying score data for each of a player's actions of the match, and cause the storage to store the tag information identifying the score data in association with the match situation data;
create tag information identifying chat data whenever the server chat data and the user chat data are created or input, and cause the storage to store the tag information identifying the chat data in association with the server chat data and the user chat data; and
create tag information identifying synchronous data that is information corresponding to the tag information identifying the score data and the tag information identifying the chat data, and cause the storage to store the match situation data, the server chat data, and the user chat data in association with each other by the tag information identifying the synchronous data and the upload times, and
the hardware controller is configured to, when a display of one of the match situation data, the server chat data, and the user chat data is changed in the display unit, detect tag information of other of the match situation data, the server chat data, and the user chat data, the other being last from an upload time of the one, and cause the display unit to display the other corresponding to the tag information of the other.

2. The chat terminal device according to claim 1,
wherein the hardware controller causes the display unit to display the match situation data, the server chat data, and the user chat data in chronological order, and
in response to detecting that a past item of one of the match situation data, the server chat data, or the user chat data is selected and changed, the hardware controller changes the other data to be displayed corresponding to a upload time of the past item.

3. The chat terminal device according to claim 2, wherein the hardware controller applies a highlight to a display area for the other data changed.

4. The chat terminal device according to claim 2, wherein the hardware controller displays a guide display on the display unit to return display of the other data changed to a latest display.

5. A chat system comprising.
a server to which match situation data, server chat data, and user chat data are uploaded, the match situation data representing a situation of a match, the server chat data corresponding to the match and being generated by the server, and the user chat data representing chat content corresponding to the match and input by a user;
a chat display terminal including a communication circuitry configured to acquire the match situation data, the server chat data, and the user chat data from the server;
a storage configured to store the match situation data, the server chat data, and the user chat data in association with upload times at which the match situation data, the server chat data, and the user chat data are uploaded to the server; and
a hardware controller configured to cause a first area of a display unit to display the match situation data which is stored in the storage and to cause a second area of the display unit to display, at a same time, the server chat data and the user chat data which are stored in the storage and correspond to each other in the upload times,
wherein
the hardware controller further includes a storage hardware controller,
the hardware storage controller is configured to:
create tag information identifying score data for each of a player's actions of the match, and cause the storage to store the tag information identifying the score data in association with the match situation data;
create tag information identifying chat data whenever the server chat data and the user chat data are created or input, and cause the storage to store the tag information identifying the chat data in association with the server chat data and the user chat data; and
create tag information identifying synchronous data that is information corresponding to the tag information identifying the score data and the tag information identifying the chat data, and cause the storage to store the match situation data, the server chat data, and the user chat data in association with each other by the tag information identifying the synchronous data and the upload times, and
the hardware controller is configured to, in response to determining that a display of one of the match situation data, the server chat data, and the user chat data is changed in the display unit, detect tag information of other of the match situation data, the server chat data, and the user chat data, the other being last from an upload time of the one, and cause the display unit to display the other corresponding to the tag information of the other.

6. A chat display method comprising:
acquiring match situation data, server chat data, and user chat data from a server to which the match situation data, the server chat data, and the user chat data are uploaded, the match situation data representing a situation of a match, the server chat data corresponding to the match and being generated by the server, and the user chat data representing a chat content corresponding to the match and input by a user;
causing a storage to store the match situation data, the server chat data, and the user chat data in association with upload times at which the match situation data, the server chat data, and the user chat data are uploaded to the server; and
causing a first area of a display unit to display the match situation data that is stored in the storage and causing a second area of the display unit to display, at a same time, the server chat data and the user chat data that are stored in the storage and correspond to each other in the upload times;
creating tag information identifying score data for each of a player's actions of the match, and causing the storage to store the tag information identifying the score data in association with the match situation data;
creating tag information identifying chat data whenever the server chat data and the user chat data are created or input, and causing the storage to store the tag information identifying the chat data in association with the server chat data and the user chat data; and
creating tag information identifying synchronous data that is information corresponding to the tag information identifying the score data and the tag information identifying the chat data, and causing the storage to store the match situation data, the server chat data, and the user chat data in association with each other by the tag information identifying the synchronous data and the upload times,
wherein
the method further comprises, when a display of one of the match situation data, the server chat data, and the user chat data is changed in the display unit, detecting tag information of other of the match situation data, the server chat data, and the user chat data, the other being last from an upload time of the one, and causing the display unit to display the other corresponding to the tag information of the other.

7. A non-transitory computer readable recording medium storing therein a chat display program for causing a computer to execute a process, the process comprising:
acquiring match situation data, server chat data, and user chat data from a server to which the match situation data, the server chat data, and the user chat data are uploaded, wherein the match situation data represents a situation of a match, the server chat data corresponds to the match and is generated by the server, and the user chat data represents chat content corresponding to the match and input by a user;
causing a storage to store the match situation data, the server chat data, and the user chat data in association with upload times at which the match situation data, the server chat data, and the user chat data are uploaded to the server;
causing a first area of a display unit to display the match situation data that is stored in the storage and causing a second area of the display unit to display, at a same time, the server chat data and the user chat data that are stored in the storage and correspond to each other in the upload times;
creating tag information identifying score data for each of a player's actions of the match, and causing the storage to store the tag information identifying the score data in association with the match situation data;
creating tag information identifying chat data whenever the server chat data and the user chat data are created or input, and causing the storage to store the tag information identifying the chat data in association with the server chat data and the user chat data; and creating tag information identifying synchronous data that is information corresponding to the tag information identifying the score data and the tag information identifying the chat data, and causing the storage to store the match situation data, the server chat data, and the user chat data in association with each other by the tag information identifying the synchronous data and the upload times, wherein the process further comprises, in response to determining that a display of one of the match situation data, the server chat data, and the user chat data is changed in the display unit, detecting tag information of other of the match situation data, the server chat data, and the user chat data, the other being last from an upload time of the one, and causing the display unit to display the other corresponding to the tag information of the other.

* * * * *